(No Model.) 2 Sheets—Sheet 1.

C. BELKNAP & J. W. BRADLEY.
VALVE MECHANISM.

No. 286,676. Patented Oct. 16, 1883.

WITNESSES
Wm A. Skinkle
H. W. Elmore

INVENTORS
Charles Belknap
John W. Bradley
By their Attorneys
Baldwin, Hopkins, & Peyton.

(No Model.) 2 Sheets—Sheet 2.

C. BELKNAP & J. W. BRADLEY.
VALVE MECHANISM.

No. 286,676. Patented Oct. 16, 1883.

WITNESSES
Wm A. Skinkle
H. W. Elmore

INVENTORS
Charles Belknap
John W. Bradley
By their Attorneys,
Baldwin, Hopkins, & Peyton

United States Patent Office.

CHARLES BELKNAP, OF BRIDGEPORT, AND JOHN W. BRADLEY, OF STRATFORD, ASSIGNORS OF ONE-HALF TO THE BELKNAP MANUFACTURING COMPANY, OF BRIDGEPORT, CONNECTICUT.

VALVE MECHANISM.

SPECIFICATION forming part of Letters Patent No. 286,676, dated October 16, 1883.

Application filed January 23, 1883. (No model.)

*To all whom it may concern:*

Be it known that we, CHARLES BELKNAP, of Bridgeport, and JOHN W. BRADLEY, of Stratford, both in the county of Fairfield and State of Connecticut, have invented certain new and useful Improvements in Valve Mechanism, of which the following is a specification, reference being had to the accompanying drawings.

Our invention relates particularly to check-valves, but is applicable to other kinds of valves.

The object of our invention is to provide for the accurate fitting of the disk or valve to the valve-seat in such a way that not only an original valve and its seat may be conveniently made to fit exactly, but also so that either may be readily replaced, when worn, by another, without inconvenience in detaching the parts of the valve, and without replacing the valve-shell.

A very common method of making check-valves which have metallic seats is to form the seat within and as an integral part of the shell. The consequence is that the interior of the shell, where the seat is formed, has to be specially ground after the shell is cast, and if the valve proves not to be tight from wear or other cause, it becomes necessary to detach the shell and regrind its interior seat, or to throw the whole away and replace it by a new shell and valve-seat. Besides this it requires special and costly tools and the employment of skilled labor to grind the seats properly within the interior of the valve-shells. Our invention seeks to do away with these objections and overcome these difficulties by providing a simple economical structure, which may be readily taken to pieces and repaired when out of order by the mere replacing of special parts without special fitting being required.

Figure 1:
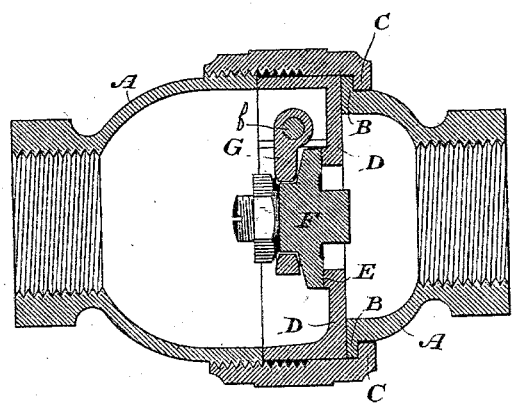
Figure 2:
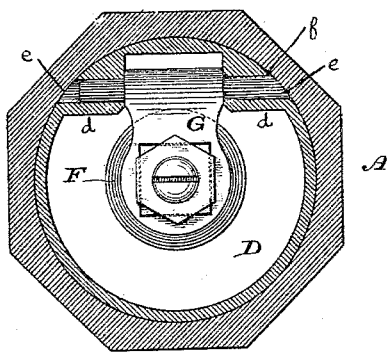
Figure 3:
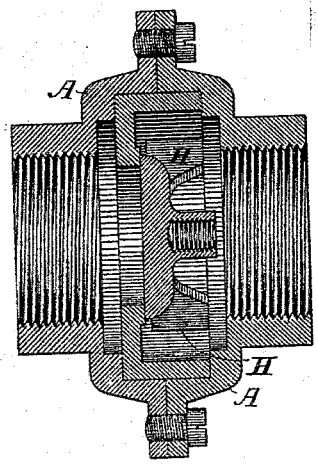
Figure 4:
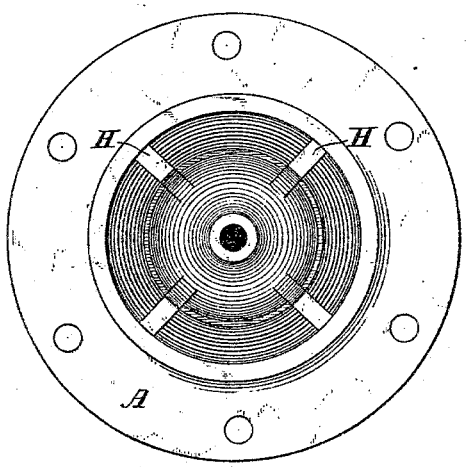

In the accompanying drawings, illustrating our improvements, Figure 1 is a central section. Fig. 2 is a central section taken at right angles with Fig. 1. Fig. 3 is a central section of a modified form of valve-shell and of a reciprocating valve. Fig. 4 is a plan view of one-half of the valve-shell, (shown in Fig. 3,) exhibiting its interior, containing the reciprocating valve.

Referring to the letters upon the drawings, A indicates a valve-shell, which may be of any suitable construction, composed of at least two parts capable of being tightly joined together, and of being separated conveniently at will.

A good form of valve-shell is shown in Figs. 1 and 2, where it is represented as composed of three parts, two of them forming pipe-connections, and the central part forming the cup or recess for the valve mechanism, and being joined to one pipe-connection by means of a flange, B, projecting from one pipe-connection and resting upon a corresponding seat, C, in the central portion of the shell, and being joined to the other pipe-connection by means of screw-threads.

D indicates a recessed or dished independent valve-seat, fitting within the central part of the shell and provided with a central opening coincident with the pipe-connections, and smooth at E to receive the valve. The valve-seat is formed integrally with shoulders $d$, in which are formed sockets $e$ for the bearing-pin $f$ of the hinged valve. The disk-valve seat is firmly clamped between sections A and B by means of the screw-collar C. The side walls of the valve-seat constitute a tight internal packing and a guide or support for the valve.

F indicates a disk or valve proper, smooth on its face to fit the smooth surface of the valve-seat, and connected loosely in any ordinary and suitable way—as, for example, by a screw and nut, in this instance—with an oscillating arm, G, pivoted at one side of the valve-seat. The disk is preferably mounted on an angular stem, as shown, so that, although loose, it will not rotate. The object of loosely connecting the disk with the oscillating arm is that when the disk is brought down upon the smooth surface of the seat and pressed to place, it may tilt slightly in any direction necessary to automatically accommodate itself to the seat and press evenly upon all points, thus making a perfectly tight joint under all circumstances; and the object of having the disk non-rotating is that if any cavity or protuberance occur in its face it will form only one protuberance or cavity in the seat which will correspond with and neutralize that of the disk. In rotating disks a single nick or cavity will often form a series of protuberances on the seat, which will destroy the smooth bearing-surface and mar the efficiency of the valve. The result is a new valve-disk may be applied at any time and it will be sure to make a tight fit. A reciprocating instead of an oscillating valve-disk may be employed, as illustrated in Figs. 3 and 4, where it will be seen that the valve has a certain limited play, being guided within the recessed valve-seat by the spider-arms H, and being free to automatically adjust itself, so as to fit perfectly and press equally upon all parts of the smooth bearing-surface of the valve-seat, thus making a perfectly-tight joint.

Having thus described the construction and operation of our improved valve mechanism, what we claim to be new therein, and desire to secure by Letters Patent of the United States, is—

1. An improved valve composed of a valve-seat, a stiff hinged arm having a stationary bearing, and a non-rotating disk loosely connected to the arm, substantially as set forth, so that when the disk is pressed to its seat it is free to adjust itself and bear equally at all points.

2. The combination, with the sectional valve-shell, of an independent removable dished or recessed valve-seat, firmly clamped between the sections of the shell (whereby a tight internal packing is afforded) and the valve contained within the valve-seat, substantially as described.

3. The combination of the hinged valve and an independent removable dished or recessed valve-seat with shoulders integrally formed therewith, which are provided with sockets for the bearing-pin of the hinged valve, substantially as set forth.

4. The combination, with the valve-shell, of an independent removable dished or recessed valve-seat, containing a valve composed of a hinged arm and a removable disk loosely connected together, the valve-seat and valve being conveniently removable together from the shell, substantially as set forth.

In testimony whereof we have hereunto subscribed our names this 19th day of January, A. D. 1883.

CHARLES BELKNAP.
JOHN W. BRADLEY.

Witnesses:
A. H. WARNER,
D. T. ELLIS.